(12) United States Patent
Sato et al.

(10) Patent No.: US 11,656,183 B2
(45) Date of Patent: May 23, 2023

(54) LIGHT DETECTION SENSOR, LIGHT DETECTION DEVICE, SHEET PROCESSING DEVICE, AND LIGHT DETECTION METHOD

(71) Applicant: GLORY LTD., Himeji (JP)

(72) Inventors: Takeshi Sato, Himeji (JP); Hiroshi Konishi, Himeji (JP); Yuuichirou Okui, Himeji (JP)

(73) Assignee: GLORY LTD., Himeji (JP)

( * ) Notice: Subject to any disclaimer, the term of this patent is extended or adjusted under 35 U.S.C. 154(b) by 181 days.

(21) Appl. No.: 17/060,100

(22) Filed: Oct. 1, 2020

(65) Prior Publication Data
US 2021/0018444 A1 Jan. 21, 2021

Related U.S. Application Data

(63) Continuation of application No. PCT/JP2019/014566, filed on Apr. 2, 2019.

(30) Foreign Application Priority Data

Apr. 5, 2018 (JP) .............................. JP2018-072992

(51) Int. Cl.
*G01N 21/86* (2006.01)
*B42D 25/29* (2014.01)
(Continued)

(52) U.S. Cl.
CPC .............. *G01N 21/86* (2013.01); *B42D 25/29* (2014.10); *B65H 43/08* (2013.01); *G01N 21/33* (2013.01);
(Continued)

(58) Field of Classification Search
CPC ... G01N 2021/8618; G01N 2021/8663; G01N 21/33; G01N 21/86; G01N 21/892; G07D 7/1205; G07D 7/121; G07D 7/205
See application file for complete search history.

(56) References Cited

U.S. PATENT DOCUMENTS 6,297,509 B1 10/2001 Lipkowitsch et al.
2011/0121203 A1* 5/2011 Rapoport ............. G07D 7/1205
250/459.1
(Continued)

FOREIGN PATENT DOCUMENTS

CN 102893309 A 1/2013
DE 10 2004 021397 A1 11/2005
(Continued)

OTHER PUBLICATIONS

Extended European search report dated Apr. 30, 2021, in corresponding European patent Application No. 19780775.3, 8 pages.
(Continued)

*Primary Examiner* — Dominic J Bologna
*Assistant Examiner* — Amanda Merlino
(74) *Attorney, Agent, or Firm* — Xsensus LLP

(57) ABSTRACT

A light detection sensor includes a light source that irradiates a detection target with light, a rod lens that collects emitted light from the detection target, a first light receiving element that detects the emitted light that has passed through the rod lens, and a second light receiving element that detects the emitted light that has passed through the rod lens, at a position different from a position at which the first light receiving element detects the light.

12 Claims, 13 Drawing Sheets

(51) Int. Cl.
  *B65H 43/08* (2006.01)
  *G01N 21/33* (2006.01)
(52) U.S. Cl.
  CPC .... *B65H 2511/512* (2013.01); *B65H 2553/44* (2013.01); *B65H 2701/124* (2013.01); *G01N 2021/8618* (2013.01); *G01N 2021/8663* (2013.01)

(56) References Cited

U.S. PATENT DOCUMENTS

| | | |
|---|---|---|
| 2014/0097359 A1 | 4/2014 | Vasic et al. |
| 2016/0238529 A1 | 6/2016 | Sato |
| 2017/0276543 A1* | 9/2017 | Bogaki ................. H04N 1/486 |

FOREIGN PATENT DOCUMENTS

| | | |
|---|---|---|
| EP | 2718910 A1 | 4/2014 |
| EP | 3197142 A1 | 7/2017 |
| JP | 2001-506001 A | 5/2001 |
| JP | 2003-006624 A | 1/2003 |
| JP | 2010-039897 A | 2/2010 |
| JP | 2016-009445 A | 1/2016 |
| JP | 2016-110355 A | 6/2016 |
| JP | 2016-151964 A | 8/2016 |

OTHER PUBLICATIONS

International Search Report and Written Opinion dated Jul. 9, 2019 for PCT/JP2019/014566 filed on Apr. 2, 2019, 9 pages including English Translation of the International Search Report.

* cited by examiner

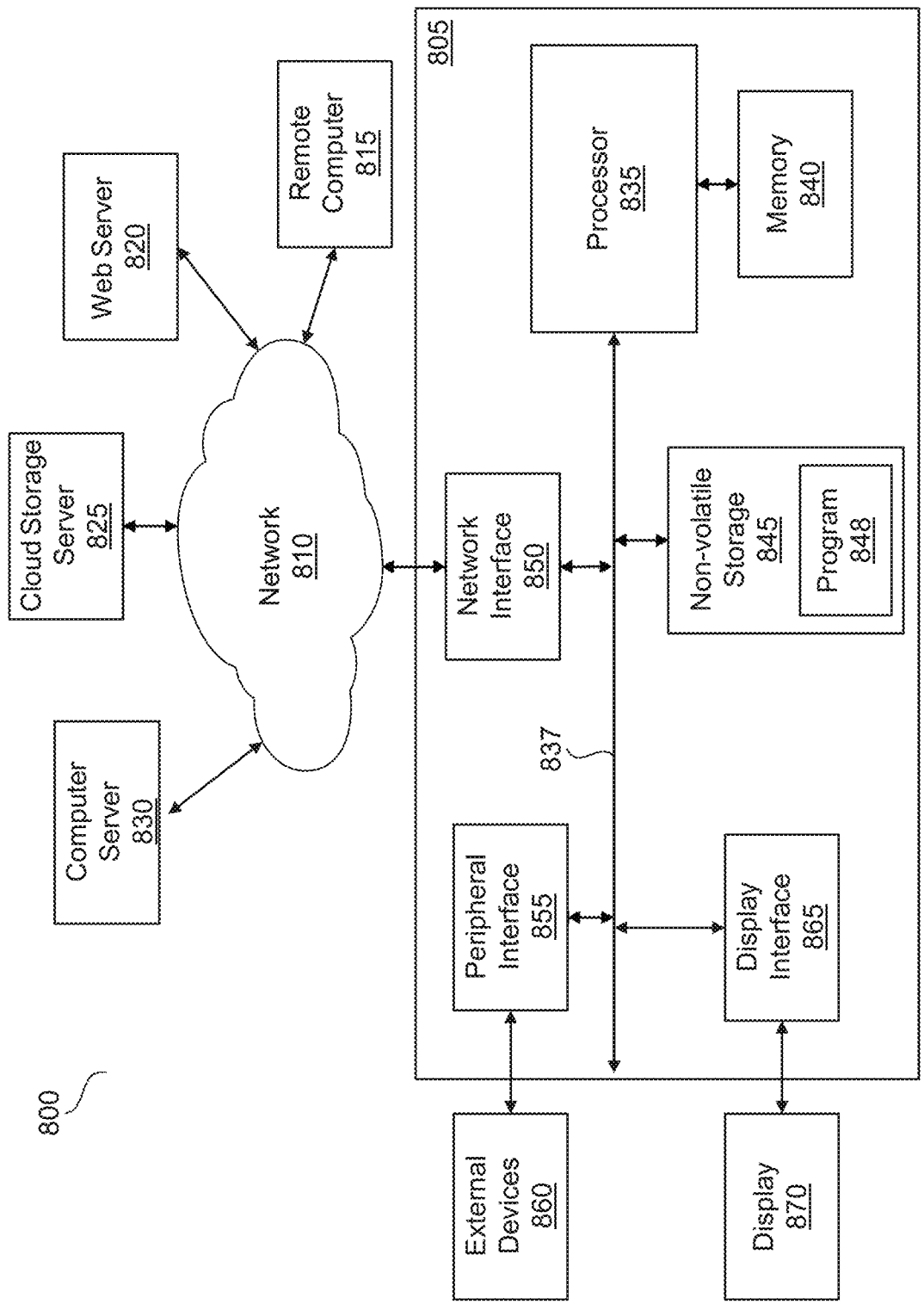

LIGHT DETECTION SENSOR, LIGHT DETECTION DEVICE, SHEET PROCESSING DEVICE, AND LIGHT DETECTION METHOD

CROSS-REFERENCE TO RELATED APPLICATIONS

The present application is a bypass continuation of PCT filing PCT/JP2019/014566, filed Apr. 2, 2019, which claims priority to JP2018-072992, filed Apr. 5, 2018, the entire contents of each of which incorporated herein by reference.

TECHNICAL FIELD

The present disclosure relates to a light detection sensor, a light detection device, a sheet processing apparatus and a light detection method.

BACKGROUND ART

Security marks having predetermined optical characteristics are conventionally used to recognize authenticity of sheets, such as banknotes and documents, products, and the like. An example of such security marks includes a special material that does not radiate radiation light under visible light but radiates radiation light only when irradiated with excitation light of a predetermined wavelength such as ultraviolet light. The security mark is provided on a sheet or product package by printing or the like for determining the authenticity of the sheet, product or the like from the radiation state of the radiation light. Phosphorescence radiated at the time of excitation light irradiation and afterglow radiated after the excitation light irradiation are used as the radiation light.

PTL 1 discloses a device that irradiates a medium with infrared light or ultraviolet light together with visible light from a light source, and after stopping the irradiation with the light, detects afterglow radiated from the medium with an optical line sensor.

PTL 2 discloses a detection device that allows light radiated from a light source to blink repeatedly for detecting fluorescence and afterglow radiated from a sheet material.

PTL 3 discloses a device including a light source and a plurality of photosensors disposed side by side in the transport direction of a luminescent material for detecting afterglow from the luminescent material. This device further detects the decay characteristics of the afterglow of the luminescent material from the intensity of the detected afterglow.

PTL 4 discloses a device that reflects light from a light source into the direction perpendicular to the transport direction of a detection target with a beam splitter, irradiates the detection target with the light, and detects the characteristics of phosphorescence from the detection target by a plurality of light detection sensors disposed in parallel to the transport direction of the detection target.

CITATION LIST

Patent Literature

PTL 1
  Japanese Patent Application Laid-Open No, 2016-9445
PTL 2
  Japanese Unexamined Patent Application Publication (Translation of PCT Application) No. 2001-506001
PTL 3
  EP Patent No. 2718910
PTL 4
  Chinese Patent Application Publication No. 102893309

SUMMARY

Exemplars Technical Problem

The characteristics of phosphorescence include the presence or absence of the phosphorescence (including afterglow), the color of the phosphorescence, and the decay characteristic of the afterglow represented by, for example, the decay time constant of the afterglow For detecting the decay characteristic of afterglow, it is necessary to detect the intensity of the afterglow from a predetermined position of a detection target more than once at different timings.

However, as recognized by the present inventors, the devices described in PTLs 1 and 2 do not detect afterglow from a predetermined position of a detection target a plurality of times at different timings, and thus cannot detect the decay characteristic of the afterglow FIG. 12A and FIG. 12B are diagrams for explaining a light detection method in a conventional light detection sensor 200 described in PTLs 1 and 2. The light detection sensor 200 illustrated in FIGS. 12A and 12B comprises a light source 130 that radiates light toward a predetermined detection region through which a detection target passes, a lens unit 120 that collects light from the detection region, and a light receiving element 110. The arrows in FIGS. 12A and 12B indicate the transport direction of a transported object.

The light source 130 starts radiation of excitation light at the timing when a part TA1 of a detection target attached to a transported object is transported upstream of the detection region, continues the radiation of the excitation light for a predetermined period, and then stops the radiation of the excitation light.

When the part TA1 of the detection target is subsequently transported to the detection region, the light receiving element 110 detects afterglow from the part TA1 of the detection target. When the other part TB1 of the detection target is then transported to the detection region, the light receiving element 110 detects afterglow from the other part TB1 of the detection target.

The conventional light detection sensor 200 detects a series of afterglow radiated from different parts of the detection target, and thus the decay characteristics of the afterglow of the detection target may not be accurately detected. When the detection target is an ink containing a luminescent material, for example, the ink may be unevenly applied, result in difference in the intensity of the afterglow radiated depending on the location. In such a case, it is difficult to calculate a correct afterglow decay characteristic of the detection target from the intensity of the detected afterglow.

PTL 3 describes a configuration with each photosensor directly detecting afterglow, not thorough a lens, from the luminescent material and with the plurality of photosensors disposed side by side in the transport direction of the luminescent material. As recognized by the present inventors, such configuration increases the size of the device, and also needs to increase the intervals between the photosensors disposed in the transport direction, and thus it is difficult to detect the decay characteristic of afterglow having a short decay time.

A plurality of sensors are disposed side by side at short intervals in the transport direction of a detection target in PTL 4, and thus the decay characteristics of afterglow having a short decay time can be detected. The light radiated from the detection target is collected by using two lenses disposed side by side perpendicularly to the transport direction of the detection target and a beam splitter disposed between these lenses in PTL 4. As recognized by the present inventors, this configuration increases the size of the device in the direction perpendicular to the transport direction.

PTL 4 also describes detecting afterglow from a detection target after the detection target passes a light irradiation region, but the detection target may be irradiated with the light from the light source, which is always lit, after the detection target passes the light irradiation region. However, this configuration makes accurate detection of the decay characteristics of the afterglow difficult.

In contrast, a light detection sensor, a light detection device, a sheet processing apparatus and light detection method as described herein, accurately detect the emission characteristic of phosphorescence and succeed in downsizing the devices used therein.

Exemplary Solution(s)

An example light detection sensor of the present disclosure includes a light source that irradiates a detection target with light, a rod lens that collects emitted light from the detection target, a first light receiving element that detects the emitted light that has passed through the rod lens, and a second light receiving element that detects the emitted light that has passed through the rod lens, at a position different from a position at which the first light receiving element detects the light. The light detection sensor, may be included in a light detection device, which in turn may be included in a sheet processing apparatus, or used in a light detection method, as described herein.

Advantageous Effects

The light detection sensor, light detection device, sheet processing apparatus and light detection method of the present disclosure are capable of accurately detecting the emission characteristic of phosphorescence and downsizing the devices used therein.

BRIEF DESCRIPTION OF DRAWINGS

FIG. 13 is a diagram of programmable circuitry in the form of a computer configured to implement the control operations described herein.

DESCRIPTION OF EMBODIMENTS

Embodiment 1

Figure 1:
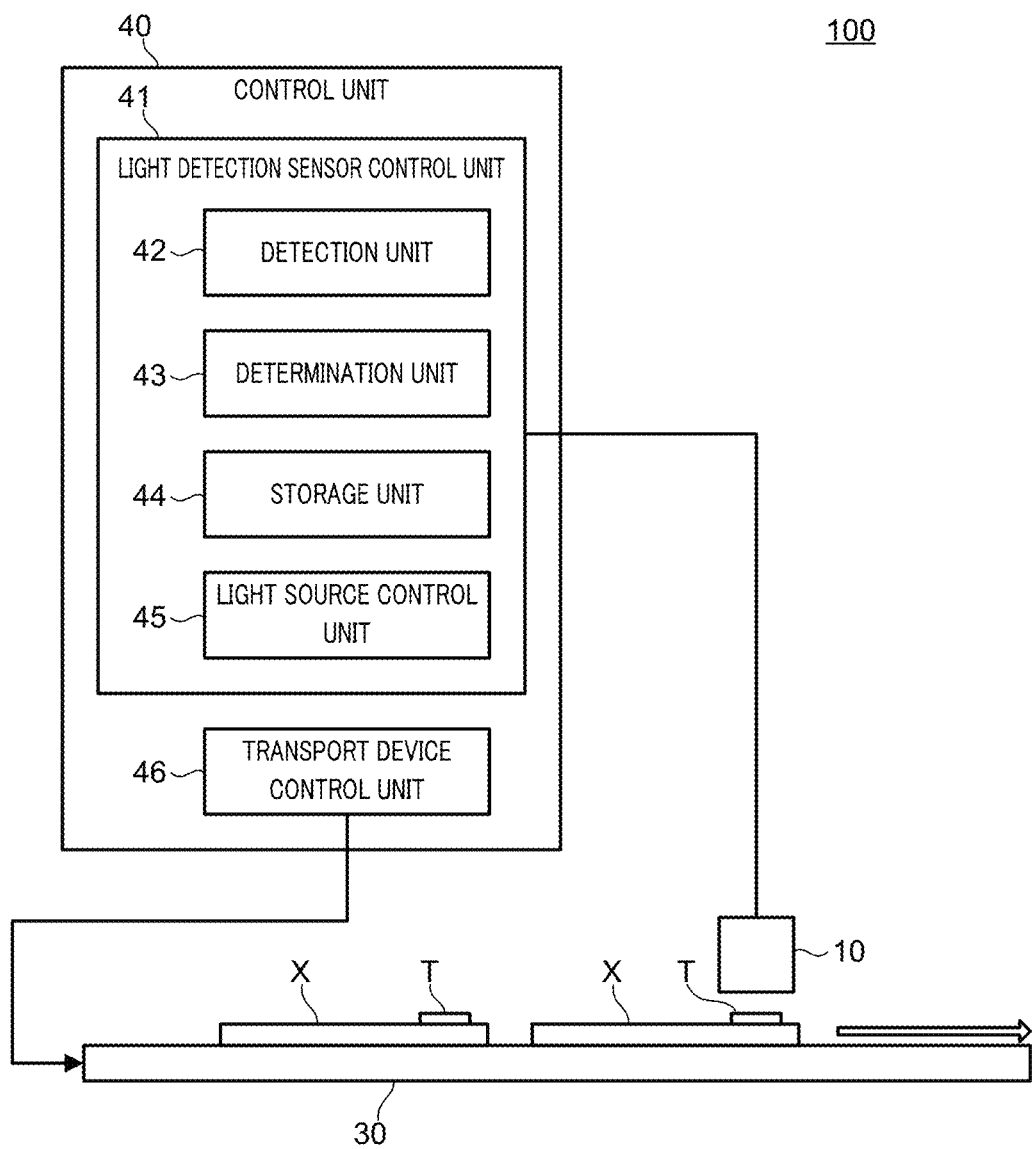
FIG. 1 illustrates exemplary functions and configuration of units in a light detection device of the present disclosure.

Hereinafter, an embodiment 1 of the present disclosure will be described with reference to the drawings. The same components are denoted by the same reference numerals. The drawings schematically illustrate the components for easy understanding.

(Configuration of Light Detection Device)

FIG. 1 illustrates exemplary functions and configuration of units in light detection device 100 of the present disclosure. Light detection device 100 is used for deciding the authenticity of a transported object X which has a detection target T attached thereto, and which is transported by a transport device 30.

For example, the transported object X is a sheet medium such as a bill (banknote) or a valuable security, and the detection target T is a security mark printed on the banknote or the like with an ink comprising a phosphorescent radiation material that radiates phosphorescence when electrons in the molecules are excited. The phosphorescent radiation material applied to the transported object X is predetermined according to the type of transported object X. The light detection device 100 comprises the transport device 30, a light detection sensor 10, and a control unit 40. While the term "unit" is used in the present disclosure, it is done so in the context of the units being physical structures, and thus "unit" and "structure" may be used synonymously herein. For example, the structure of the control unit 40, is described in more detail in terms of the programmable circuitry of FIG. 13 which controls the timing of actions described in the other figures in the present disclosure.

Herein, phosphorescence refers to light radiated by a phosphor when the phosphor is irradiated with excitation light, or a phenomenon of radiating such light. The phosphorescence is light radiated by a phosphor during and after irradiation with excitation light. In particular, the phosphorescence radiated by the phosphor after the irradiation is referred to as afterglow.

The transport device 30 is a device for continuously transporting the transported object X, to which the detection target T is attached at a predetermined position, in the direction indicated by the arrow in FIG. 1. The transport device 30 is composed of a belt conveyer, a roller conveyer, a floating transport device, and/or the like in accordance with characteristics such as the shape of the transported object X. The embodiment 1 of the present disclosure describes the transport device 30 composed of a belt conveyer.

The belt conveyer comprises a belt and a pulley for driving the belt. A rotary encoder for detecting the number of rotations (rotation angle) of the pulley is connected to the rotation shaft of the pulley. The transport device 30 comprises a passage detection sensor (not illustrated), for detecting passage of the transported object X, in the upstream side of the light detection sensor 10 in the transport direction of the transported object X.

The control unit 40 is a control device for controlling the light detection sensor 10, the transport device 30 and the like. The control unit 40 is composed of an electric power source, a CPU, a memory and the like, and comprises a light detection sensor control unit 41 and a transport device control unit 46. Further details of the control unit 40 are described in reference to FIG. 13.

The transport device control unit 46 is a control unit (or controller) for controlling the operation of the transport device 30. The transport device control 46 calculates information regarding the presence position of the detection target T such as a moving distance of the belt, that is, a moving distance of the detection target T, based on the number of pulses of the rotary encoder after the passage detection sensor detects the passage of the transported object X.

The light detection sensor control unit 41 (light detection sensor controller) comprises a detection unit 42 (light detector), a determination unit 43 (determination circuitry), a storage unit 44 (non-transitory storage medium) and a light source control unit 45 (light source controller).

The detection unit 42 receives a light detection signal output from the light detection sensor 10. The detection unit 42 calculates the intensity of the radiation light radiated by the detection target T based on the light detection signal.

The storage unit 44 stores information such as the intensity of each wavelength band of the radiation light radiated from the true detection target T, the decay time constant $\tau$ of the afterglow to be described below. The information is reference data serving as the base for deciding the type or authenticity of the detection target T.

The determination unit 43 compares the intensity of the radiation light obtained by the detection unit 42 with the intensities stored as the reference values in the storage unit 44 to determine the substance comprised in the detection target T and decide the type or authenticity of the detection target T. The determination unit 43 can also decide the type or authenticity of the detection target T by calculating the decay time constant $\tau$ of phosphorescence and determining the substance included in the detection target T based on the decay time constant $\tau$ of the phosphorescence.

The light source control unit 45 is a control unit for turning on and off (in other words, lighting and extinction of) a light source of the light detection sensor 10. The light source control unit 45 turns on and off the light source based on information regarding the presence position of the detection target calculated by the transport device control unit 46.

(Configuration of Light Detection Sensor)

Figure 2:
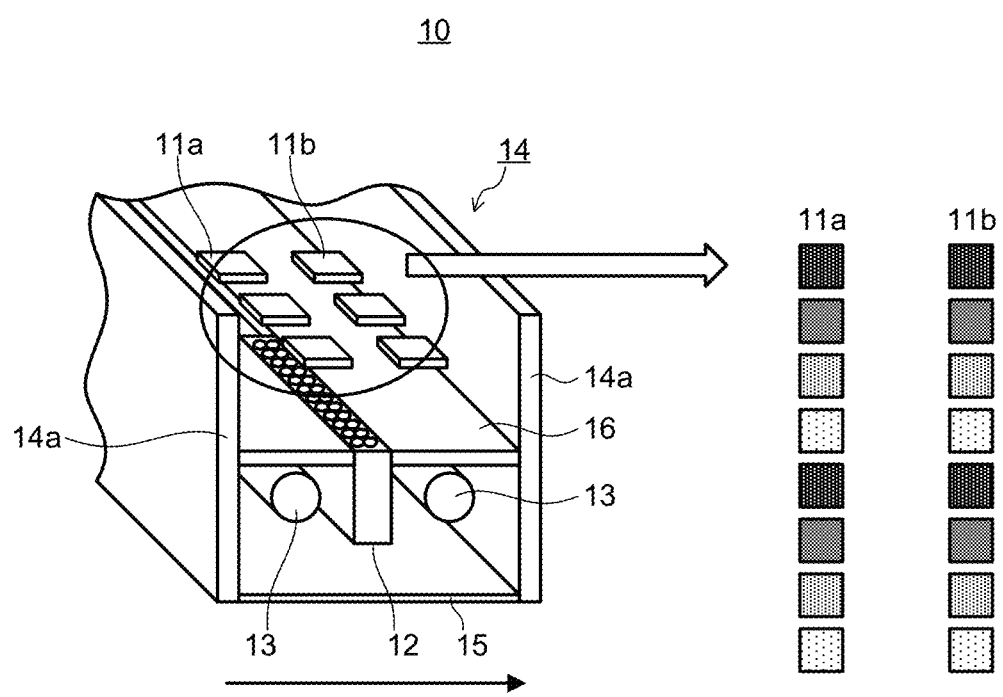
FIG. 2 illustrates an exemplary configuration of a light detection sensor according to an embodiment 1.

FIG. 2 illustrates an exemplary configuration of the light detection sensor 10 according to the embodiment 1. The light detection sensor 10 is a sensor for detecting light from the detection target attached to the transported object X. The light detection sensor 10 comprises a first light receiving element 11a, a second light receiving element 11b, a rod lens unit 12, a light source 13, a housing 14 and a transparent cover 15.

The housing 14 is a box body for accommodating the first light receiving element 11a, the second light receiving element 11b, the light source 13 and the rod lens unit 12 in its inside. The housing 14 is a rectangular parallelepiped box body that comprises a pair of rectangular side walls 14a disposed so as to face each other. A side where the transported object X passes is an open surface of the housing 14. FIG. 2 omits the illustration of the other pair of side walls that are provided perpendicularly to the pair of side walls 14a and a lid that closes the space surrounded by the four side walls from the side opposite to the side where the transparent cover 15 is provided.

The housing 14 is formed of, for example, a colored synthetic resin having a light shielding property. The material that forms the housing 14 is not limited to such a synthetic resin, as long as the material has a light shielding property, and may be a metal such as aluminum.

The rectangular transparent cover 15 is provided on the surface of the housing 14 where the surface faces the lid. The transparent cover 15 is formed of a transparent synthetic resin. Light radiated by the light source 13 and light to be received by the first light receiving element 11a and the second light receiving element 11b pass through the transparent cover 15. The light detection sensor 10 radiates light toward the detection target T through the transparent cover 15 and also receives light from the detection target T. The transparent cover 15 may be formed of glass.

The first light receiving element 11a and the second light receiving element 11b are photodetectors that receive light from the detection target T and output electric signals. The first light receiving element 11a and the second light receiving element 11b are, for example, Si photodiodes. The materials and structures of the first light receiving element 11a and the second light receiving element 11b are not particularly limited.

The first light receiving element 11a and the second light receiving element 11b are disposed side by side in the normal direction of the pair of side walls 14a. The normal direction herein is the same as the transport direction of the transported object X.

The first light receiving element 11a and the second light receiving element 11b each comprise a plurality of light receiving elements, and the plurality of light receiving elements are arranged linearly along the normal direction of the other pair of side walls.

Each light receiving element comprises optical filters individually transmitting different types of light in the bands of, for example, three primary colors, namely R (red), G (green) and B (blue), UV (ultraviolet) and IR (infrared). The first light receiving element 11a and the second light receiving element 11b do not need to comprise all these types of optical filters, and may comprise at least one of these optical filters. In addition, the light receiving element may receive light in a wide range of wavelengths by not providing an optical filter that transmits light in a specific band or by providing a transparent filter. For example, when the light from the detection target T is weak, receiving light in a wide range of wavelengths may improve the S/N ratio.

The light source 13 is a projector that irradiates the detection target T with light. The light source 13 comprises, for example, a visible light source that radiates visible light such as white light, an IR light source that radiates infrared light, and a UV light source that radiates ultraviolet light. The light source 13 can radiate these different types of light having the plurality of wavelength bands simultaneously or individually. A light shielding means 16 (light shield) such as a light shielding plate is provided between the light source 13, and the first light receiving element 11a and the second light receiving element 11b. The light shielding means 16 prevents the first light receiving element 11a and the second light receiving element 11b from directly receiving light from the light source 13 that does not pass through the transparent cover 15.

Of these different types of light radiated by the light source 13, for example, ultraviolet light is excitation light that excites the detection target T. The detection target T is excited by light in a wavelength band unique to the detection target T.

The light source 13 is provided at positions on both sides of the rod lens unit 12 which are closer to the transparent cover 15 than the first light receiving element 11a and the second light receiving element 11b.

The rod lens unit 12 is a lens unit that collects light from the detection target T. The rod lens unit 12 is, for example, a rod lens array comprising a plurality of rod lenses arranged linearly along the direction in which the plurality of light receiving elements of the first light receiving element 11a and the second light receiving element 11b described above are arranged. The rod lens is a gradient index lens, and the rod lens unit 12 forms erected images at the same magnification on the first light receiving element 11a and the second light receiving element 11b.

(Light Detection Method)

A light detection method by the light detection device 100 according to the embodiment 1 will be described with reference to FIG. 3, and FIGS. 4A and 4B. In the following, a case where the light source 13 irradiates the detection target with ultraviolet light as excitation light will be described as an example. The excitation light is not limited to ultraviolet light in the present disclosure. The wavelength of excitation light varies depending on the phosphorescent radiation material, and in addition to ultraviolet light, visible light such as red, blue, or green or infrared light may also become excitation light.

Figure 3:
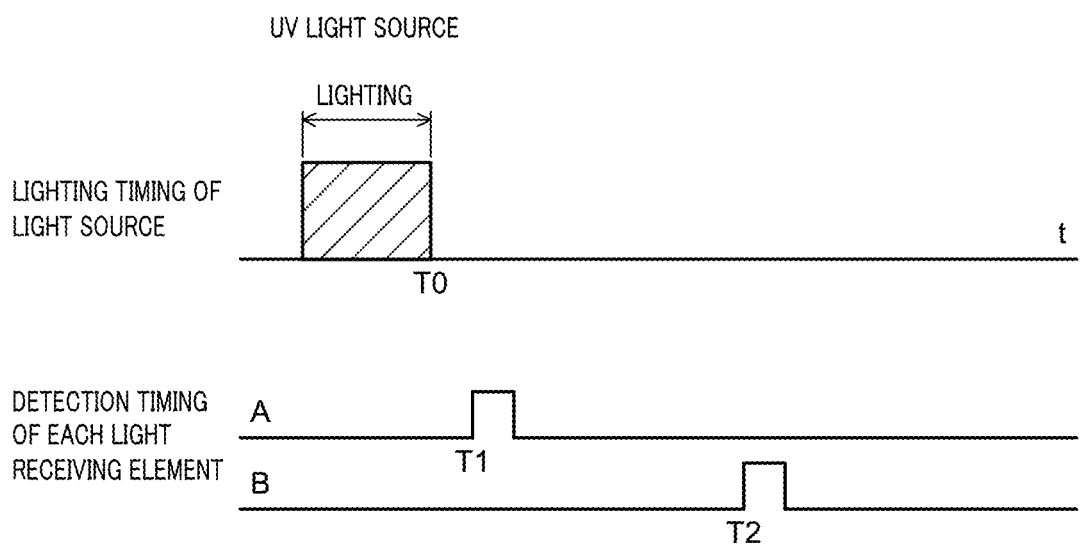
FIG. 3 illustrates the relationship between a lighting timing of a light source and a detection timing of each light receiving element in the light detection sensor according to the embodiment 1.

FIG. 3 illustrates the relationship between a lighting timing of the light source 13 and a detection timing of each light receiving element in the light detection sensor 10 according to the embodiment 1. As described below, afterglow radiated from the detection target T is detected when the detection target T is located in a detection region A and a detection region B shown in FIGS. 4A and 4B, but as illustrated in FIG. 3, the light source 13 irradiates the detection target T with ultraviolet light at a timing before a timing T1 when the detection target T reaches the detection region A.

Specifically, after the passage detection sensor detects the transported object X, the light source control unit 45 turns on the light source 13 at a timing when the detection target reaches a position upstream of the predetermined detection region A. The detection target T is then excited and radiates phosphorescence.

After that, the light source control unit 45 turns off the light source 13 at a timing T0. The detection target T thus radiates afterglow.

The first light receiving element 11a detects light from the detection region A at the first timing T1 when the detection target T reaches the detection region A. In addition, the second light receiving element 11b detects light from the detection region B at a timing T2 when the detection target T reaches the detection region B.

Figure 4A:
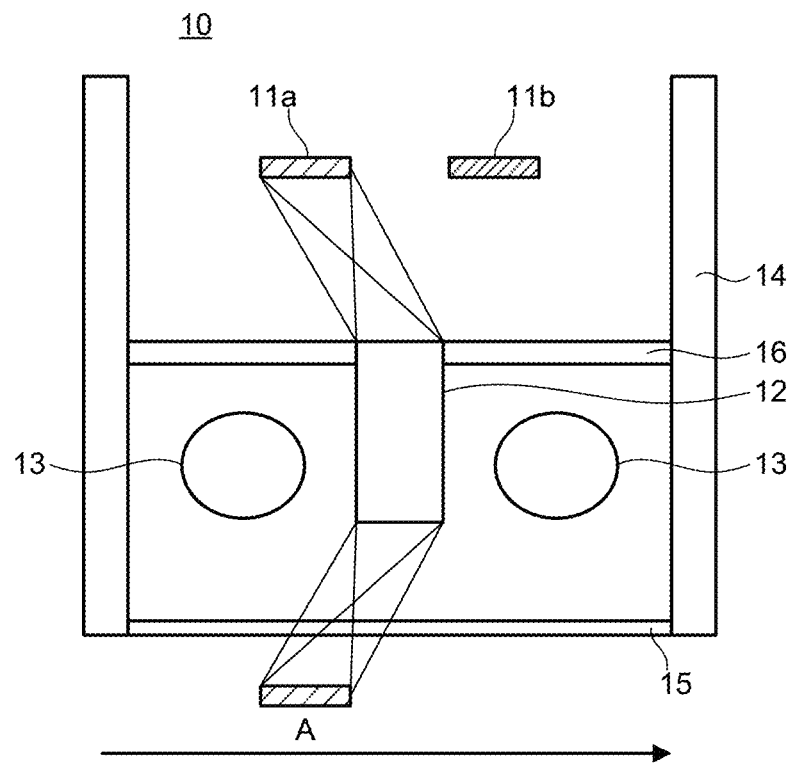
FIG. 4A is a diagram for explaining a light detection method in the light detection sensor according to the embodiment 1.
Figure 4B:
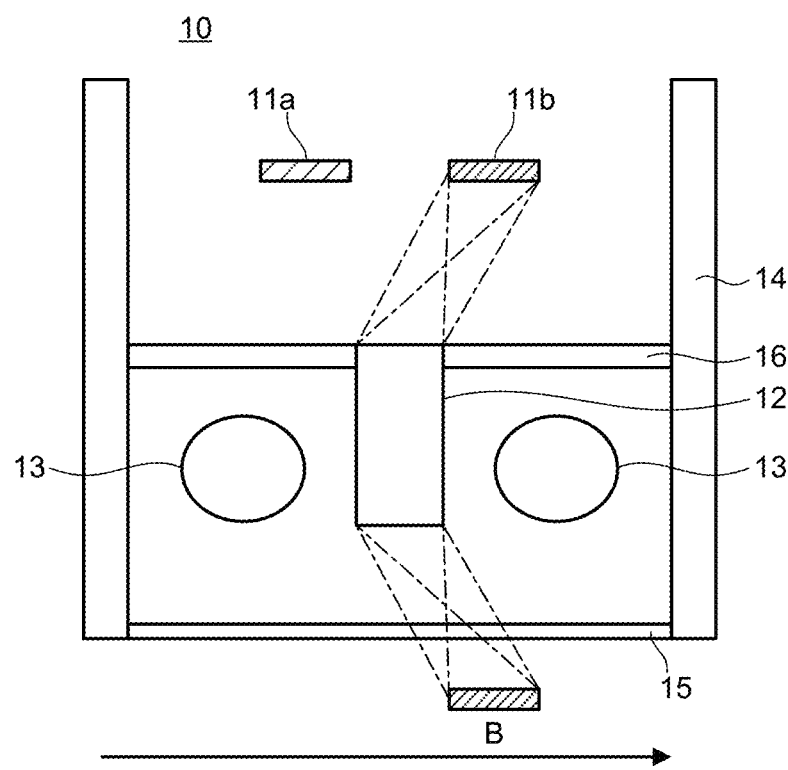
FIG. 4B is a diagram for explaining the light detection method in the light detection sensor according to the embodiment 1.

FIGS. 4A and 4B are diagrams for explaining the light detection method in the light detection sensor 10 according to the embodiment 1. The arrows in FIGS. 4A and 4B indicate the transport direction of the transported object X transported by the transport device 30.

FIG. 4A shows a case where the first light receiving element 11a detects light from the detection region A at the first timing T1 when the detection target T reaches the detection region A. The detection region A is, for example, a region located in a position symmetrical with the first light receiving element 11a with respect to a surface that bisects the rod lens unit 12 in the axial direction. The detection region A is located in the upstream side of the rod lens unit 12 in the transport direction of the transported object X.

FIG. 4B shows a case where the second light receiving element 11b detects light from the detection region B at the second timing T2 when the detection target T reaches the detection region B. The detection region B is, for example, a region located in a position symmetrical with the second light receiving element 11b with respect to the surface that bisects the rod lens unit 12 in the axial direction. The detection region B is located in the downstream side of the rod lens unit 12 in the transport direction of the transported object X.

Figure 5:
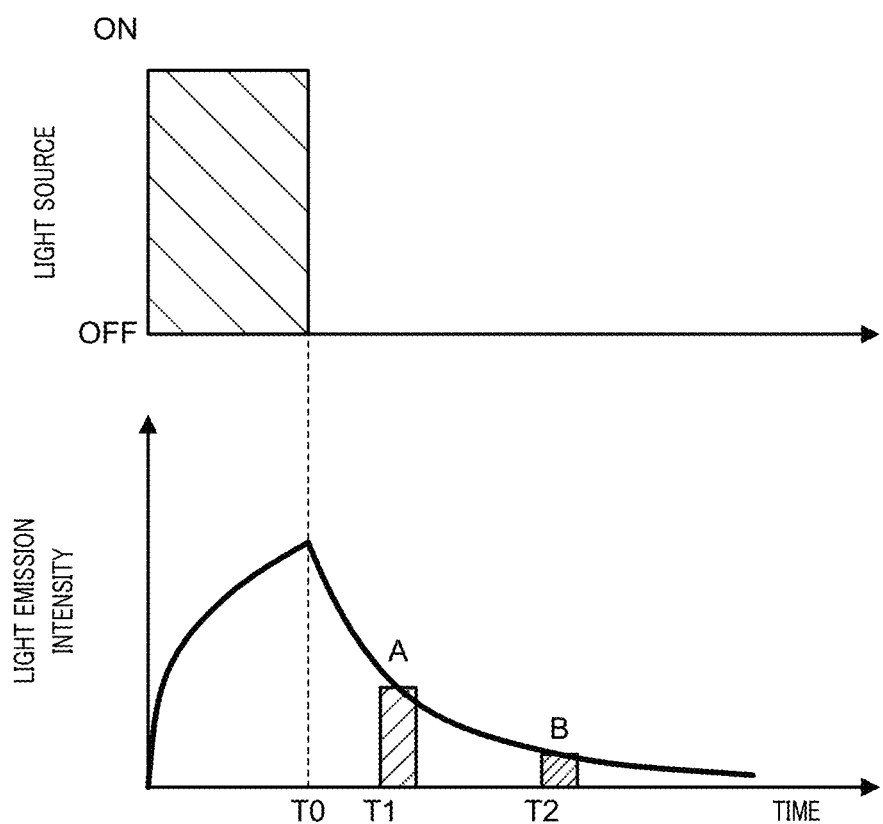
FIG. 5 illustrates the relationship between a light emission timing in the light detection sensor according to the embodiment 1 and the intensity of light radiated by a detection target.

FIG. 5 illustrates the relationship between a light emission timing in the light detection sensor 10 according to the embodiment 1 and the intensity of light radiated by the detection target T.

As described above, after the passage detection sensor detects the transported object X, the light source control unit 45 turns on the light source 13 at the timing when the detection target T reaches a predetermined position upstream of the detection region A illustrated in FIG. 4A.

The light source control unit 45 continues lighting of the light source 13 for a predetermined time while the transported object X is transported in the upstream side of the detection region A. When the light source 13 is lighted and the detection target T is irradiated with ultraviolet light that is excitation light, the intensity of the phosphorescence radiated from the detection target T gradually increases with the passage of time.

When the light source control unit 45 turns off the light source 13 at the timing T0, the light source 13 stops the irradiation of the detection target with ultraviolet light. After the irradiation with ultraviolet light stops, the detection target T radiates afterglow, but the intensity of the afterglow is attenuated with the passage of time.

Subsequently, at the first timing T1 when the detection target T reaches the detection region A, the first light receiving element 11a detects the light from the detection region A, and at the second timing T2 when the detection target T reaches the detection region B illustrated in FIG. 4B, the second light receiving element 11b detects the light from the detection region B.

The determination unit 43 calculates the decay time constant τ of the afterglow of the detection target T from the intensity of the light from the detection region A and the intensity of the light from the detection region B. The decay time constant of the afterglow can be calculated based on an equation 1 below.

$$\tau = -(t_2 - t_1)/\ln(P_2/P_1) \quad \text{(Equation 1)}$$

In the equation 1, $\tau$ is the decay time constant of the afterglow; t1 and t2 are the elapsed times from the extinction of the light source 13 to the first timing T1 and the second timing T2, respectively; and P1 and P2 are the intensities of the afterglow detected at the first timing T1 and the second timing T2, respectively.

Each phosphorescent radiation material has its unique decay time constant (the time required for the phosphorescent intensity becomes 1/e). The phosphorescence intensity decay curve obtained with the abscissa representing the elapsed time after the extinction of the light source 13 and the ordinate representing the phosphorescence intensity thus varies depending on phosphorescent radiation materials.

The determination unit 43 compares the calculated decay time constant $\tau$ of the afterglow with the reference values of the decay time constants $\tau$ of afterglow of the detection target T stored in the storage unit 44, to determine the substance comprised in the detection target T, and to decide the authenticity of the detection target T.

As described above, in the light detection device 100 according to the embodiment 1, the second light receiving element 11b can detect, at different timings, light radiated from a position of the detection target T the same as the position from which the light detected by the first light receiving element 11a is radiated. In other words, the embodiment 1 of the present disclosure can detect the intensity of afterglow radiated from a predetermined position of the detection target T at different timings. This configuration can calculate an accurate decay time constant $\tau$ of the afterglow radiated from the detection target T, and decide the authenticity of the detection target T.

In addition, one rod lens unit 12 forms images of the detection target T on the first light receiving element 11a and the second light receiving element 11b in the embodiment 1. Such configuration allows providing of a lens unit for every light receiving element to become unnecessary, and thus the light detection sensor 10 and the light detection device 100 comprising the light detection sensor 10 can be downsized.

One rod lens unit 12 forms images of the detection target T on both the first light receiving element 11a and the second light receiving element 11b. Such a configuration can shorten the distance between the detection regions A and B, and as a result, can shorten the time interval for detecting the intensities of afterglow. The intensities of afterglow can be thus detected even for the detection target T whose afterglow has a small decay time constant $\tau$. In addition, the distances from the first light receiving element 11a and the second light receiving element 11b to the rod lens portion 12 may be different in the transport direction. Each distance can be selected according to the purpose of detection.

The light detection device 100 according to the embodiment 1 is, for example, provided in a sheet processing apparatus. The sheet processing apparatus recognizes the type of sheet to be processed such as a banknote or a valuable security based on the image read from the sheet, and also recognizes the authenticity of the sheet by deciding the type and authenticity of the detection target T attached to the sheet based on light detected by the first light receiving element 11a and the second light receiving element 11b of the light detection sensor 10, and on the reference data stored in the storage unit 44.

When the light detection device 100 is provided in the sheet processing apparatus, the light detection sensor control unit 41 does not need to be provided with the determination unit 43, the storage unit 44, and the like.

For example, the sheet processing apparatus includes a transport unit (a conveyor) for a transporting sheet, a storage unit that stores reference data for recognizing the sheet, a recognition unit for recognizing the transported sheet, and a control unit for controlling the entire sheet processing apparatus comprising the transport unit, the storage unit and the recognition unit. The recognition unit recognizes the type and authenticity of a sheet that is a transported object. The recognition unit comprises, in addition to the light detection sensor 10, an image sensor for reading an images of a sheet, a magnetic sensor for reading magnetic information on the sheet, and the like.

The recognition unit recognizes the type of sheet by comparing the read image with the reference data, and also recognizes the authenticity of the sheet by comparing at least one of the characteristic of the light detected by the light detection sensor 10, the image read by the image sensor, the magnetic information read by the magnetic sensor, and the like with the stored reference data corresponding to the recognized sheet type. The sheet processing apparatus processes the sheet based on the result recognized by the recognition unit.

An example of the sheet processing apparatus is a banknote processing apparatus that transports the input banknotes one by one, recognizes the denomination and authenticity of the transported banknote, and performs processing based on the recognition result. Examples of the processing include a storing process transporting a banknote that is recognized as authentic to store the banknote in a storing unit according to the denomination, and a returning process transporting a banknote that cannot be recognized or a banknote that is recognized as counterfeit to a return unit to return the banknote. Examples of the bills (banknotes) include banknotes with patterns printed on paper sheets, or banknotes with patterns printed on resin sheets referred to as polymer banknotes.

(Modification 1)

In the embodiment 1 described above, the first light receiving element 11a and the second light receiving element 11b detect the intensity of the afterglow radiated from the detection target T. However, the light detection device 100 may detect phosphorescence radiated during the irradiation with excitation light. The modification will be described below.

After the passage detection sensor detects the transported object X, the light source control unit 45 turns on the light source 13 at the first timing T1 when the detection target T reaches the detection region A illustrated in FIG. 4A. The first light receiving element 11a detects light from the detection region A at the first timing T1 when the detection target reaches the detection region A.

The light source control unit 45 continues lighting of the light source 13. At the second timing T2 when the detection target T reaches the detection region B illustrated in FIG. 4B, the second light receiving element 11b detects the light from the detection region B. The light source control unit 45 turns off the light source 13 after the detection target T passes the detection region B.

The second light receiving element 11b thus can detect light from a position of the detection target T, where the light detected by the first light receiving element 11a is radiated, at different timings. In other words, the light detection device 100 can detect the intensity of phosphorescence radiated from a predetermined position of the detection target T at a plurality of different timings during the irradiation with the excitation light.

The determination unit 43 thus can calculate the emission characteristic of the phosphorescence radiated from the detection target T during the irradiation with the excitation light and decide the authenticity of the detection target T by using the emission characteristic of the phosphorescence.

In this modification, the lighting timing of the light source 13 is the timing at which the detection target reaches the detection region A, but the lighting timing may be earlier.
(Modification 2)

The light detection device 100 may detect phosphorescence radiated from the detection target during the irradiation with ultraviolet light at the detection region A illustrated in FIG. 4A, and detect afterglow radiated from the detection target T at the detection region B illustrated in FIG. 4B. The modification will be described below.

After the passage detection sensor detects the transported object X, the light source control unit 45 turns on the light source 13 at a timing when the detection target T reaches the detection region A. The first light receiving element 11a detects light from the detection region A at the timing when the detection target T reaches the detection region A.

The light source control unit 45 turns off the light source 13 after the detection target T passes the detection region A. In addition, the second light receiving element 11b detects light from the detection region B at a timing when the detection target T reaches the detection region B.

The light detection device 100 thus can detect the intensity of phosphorescence radiated from the detection target T during the irradiation with ultraviolet light, and the intensity of afterglow radiated from the detection target T after the irradiation with the ultraviolet light is stopped. The determination unit 43 thus can decide the authenticity of the detection target T by comparing the intensities of the radiation light with the reference values of the intensities stored in the storage unit 44.

In this modification, the lighting timing of the light source 13 is the timing at which the detection target reaches the detection region A, but the lighting timing may be earlier.

Embodiment 2

In an embodiment 2, the light detection sensor 10 is further provided with a third light receiving element which is an imaging element for acquiring an image of the detection target T. Hereinafter, the embodiment 2 will be described with reference to the drawings. The same components are denoted by the same reference numerals. The drawings schematically illustrate the components for easy understanding. Description of a configuration the same as that of the embodiment 1 is omitted.
(Configuration of Light Detection Sensor)

Figure 6:
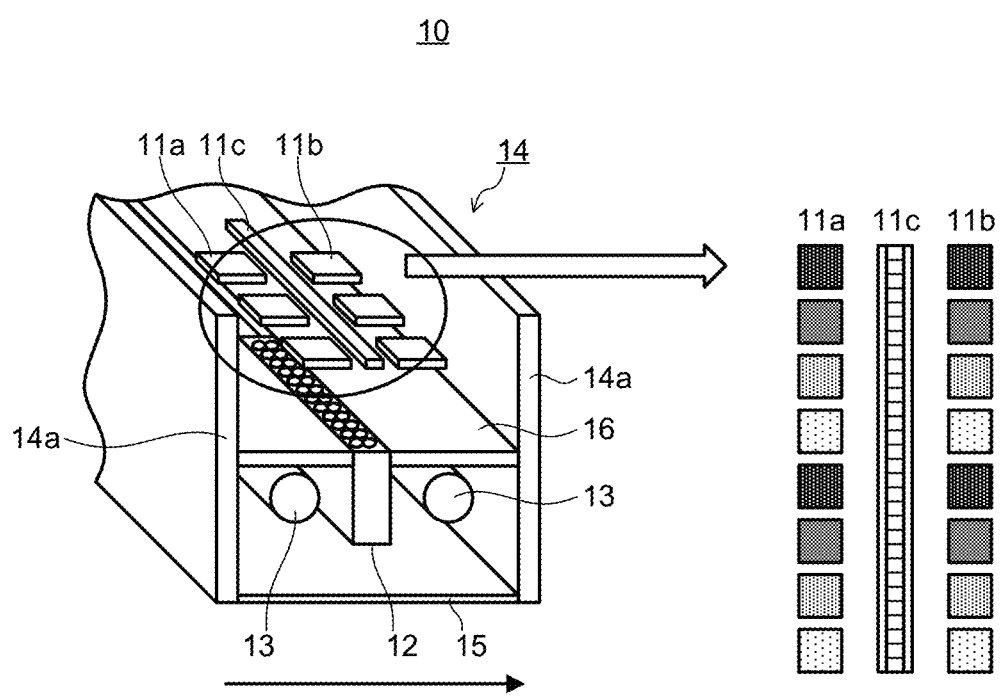
FIG. 6 illustrates an exemplary configuration of a light detection sensor according to an embodiment 2.

FIG. 6 illustrates an exemplary configuration of the light detection sensor 10 according to the embodiment 2. The light detection sensor 10 comprises, inside the housing 14, the first light receiving element 11a, the second light receiving element 11b, the third light receiving element 11c, the light source 13 and the rod lens unit 12. The third light receiving element 11c is provided at an intermediate position between the first light receiving element 11a and the second light receiving element 11b.

The third light receiving element 11c is a line sensor for acquiring an image of the detection target T. The third light receiving element 11c comprises a plurality of light receiving elements which are arranged linearly so as to be parallel to the first light receiving elements 11a and to the second light receiving elements 11b.

Each light receiving element comprises filters individually transmitting different types of light in the bands of, for example, three primary colors, namely R (red), G (green) and B (blue), UV (ultraviolet) and IR (infrared). The third light receiving element 11c acquires an image of the detection target T located in a detection region C described below. The light receiving element may receive light in a wide range of wavelengths by not providing an optical filter that transmits light in a specific band or by providing a transparent filter, as in the embodiment 1.
(Light Detection Method)

A light detection method by the light detection device 100 according to the embodiment 2 will be described with reference to FIG. 7 and FIG. 8. In the following, a case where the light source 13 radiates ultraviolet light as excitation light will be described, but the excitation light is not limited to ultraviolet light.

The third light receiving element 11c acquires the image of the detection target T during irradiation with white light, but the irradiation light may be any other visible light. Herein, it is assumed that the white light radiated by the light source 13 does not affect the intensity of afterglow radiated by the detection target.

Figure 7:
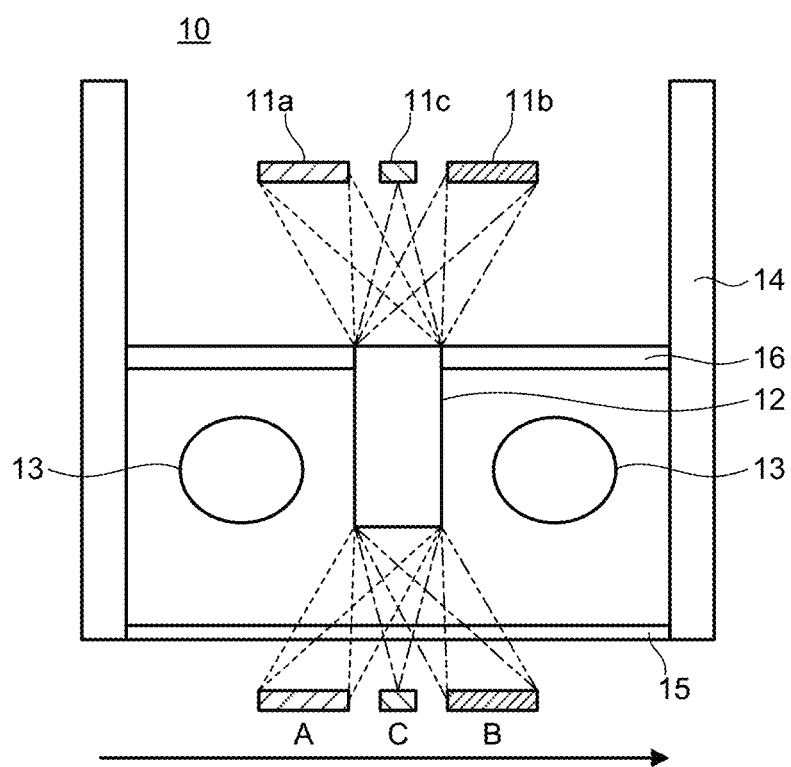
FIG. 7 is a diagram for explaining a light detection method in the light detection sensor according to the embodiment 2.

FIG. 7 is a diagram for explaining the light detection method by the light detection device 100 according to the embodiment 2. The arrows in FIG. 7 indicate the transport direction of the transported object X transported by the transport device 30.

Dotted lines in FIG. 7 indicate a case where the first light receiving element 11a detects light from the detection region A via the rod lens unit 12 at the first timing T1 when the detection target T reaches the detection region A.

The detection region A is, for example, a region located in a position symmetrical with the first light receiving element 11a with respect to a surface that bisects the rod lens unit 12 in the axial direction, as in the embodiment 1.

The dashed-dotted lines in FIG. 7 indicate a case where the third light receiving element 11c detects light from the detection region C via, the rod lens unit 12 at the second timing T2 when the detection target T reaches the detection region C.

The detection region C is, for example, a region located in a position symmetrical with the third light receiving element 11c with respect to the surface that bisects the rod lens unit 12 in the axial direction.

The third light receiving element 11c may acquire a transmission image of the detection target T. In this case, a light source different from the light source 13 is provided at a position facing the third light receiving element 11c with the detection region C interposed therebetween.

The dashed-two dotted lines in FIG. 7 indicate a case where the second light receiving element 11b detects light from the detection region B via the rod lens unit 12 at the third timing T3 when the detection target T reaches the detection region B.

The detection region B is, for example, a region located in a position symmetrical with the second light receiving element 11b with respect to the surface that bisects the rod lens unit 12 in the axial direction, as in the embodiment 1.

Figure 8:
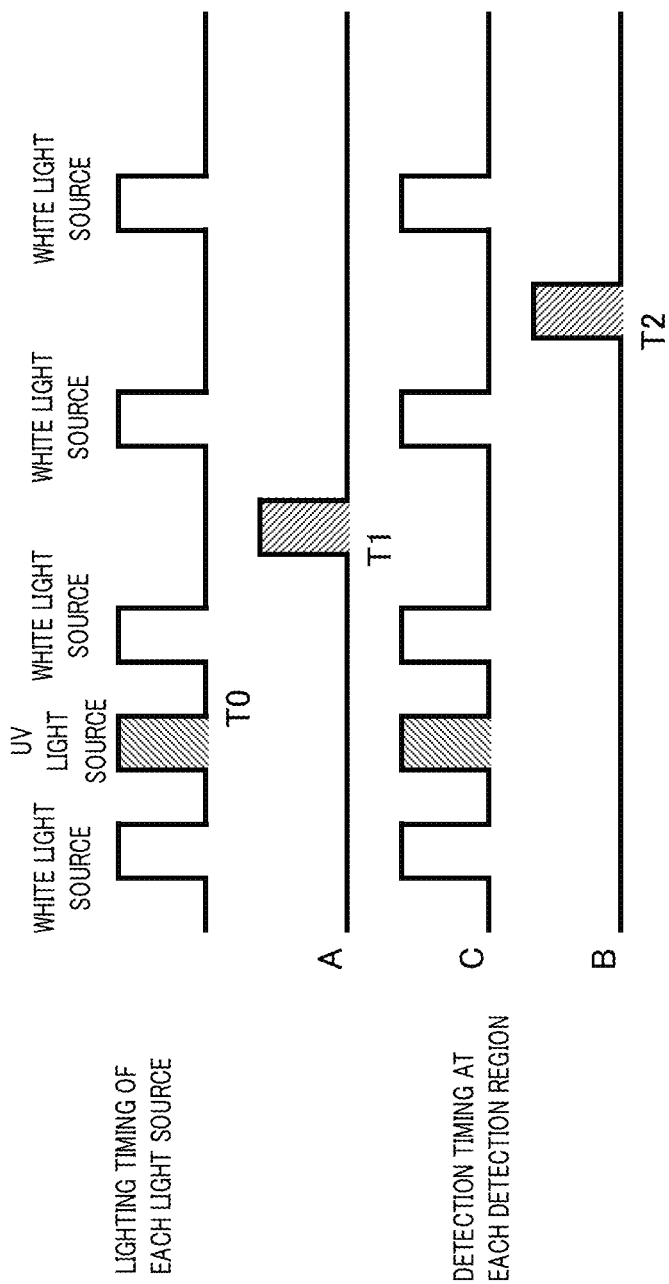
FIG. 8 illustrates the relationship between a lighting timing of each light source and a detection timing of each light receiving element according to the embodiment 2.

FIG. 8 illustrates the relationship between a lighting timing of each light source and a detection timing of each light receiving element in the light detection sensor 10 according to the embodiment 2.

FIG. 8 illustrates the lighting timings of the light source 13 when two detection targets provided on the transported object X pass the detection regions A, C, and B of the light detection sensor 10, and the detection timing of each light receiving element.

Hereinafter, a detection target on the downstream side in the transport direction is referred to as "detection target TA," and a detection target on the upstream side of the detection target TA is referred to as "detection target TB."

When the transported object X reaches the detection region C after the passage detection sensor detects the transported object X, the light source control unit 45 controls a white light source of the light source 13 to blink, for example, four times at predetermined time intervals. During each lighting period of the white light source, the third light receiving element 11c acquires an image of the transported object X located in the detection region C.

In the following, a period during which the white light source is turned off between the first lighting and the second lighting of the white light source is referred to as a first extinction period, a period during which the white light source is turned off between the second lighting and the third lighting of the white light source is referred to as a second extinction period, and a period during which the white light source is turned off between the third lighting and the fourth lighting of the white light source is referred to as a third extinction period.

The light source control unit 45 turns on a UV light source for a predetermined time at a timing when the detection target TA reaches the detection region C in the first extinction period. The third light receiving element 11c acquires an image of the detection target TA located in a detection region C during the lighting of the UV light source. At this time, the detection target TB on the upstream side of the detection target TA is located upstream of the detection region A illustrated in FIG. 7 and is excited by the ultraviolet light radiated from the UV light source that continues to be lit.

The light source control unit 45 then turns off the UV light source at the timing T0 when the detection target TA passes the detection region C.

The first light receiving element 11a detects light from detection region A at the first timing T1 when the detection target TB reaches the detection region A in the second extinction period.

Further, the second light receiving element 11b detects light from the detection region B at the second timing T2 when the detection target TB reaches the detection region B in the third extinction period in the light source control unit 45.

Figure 9:
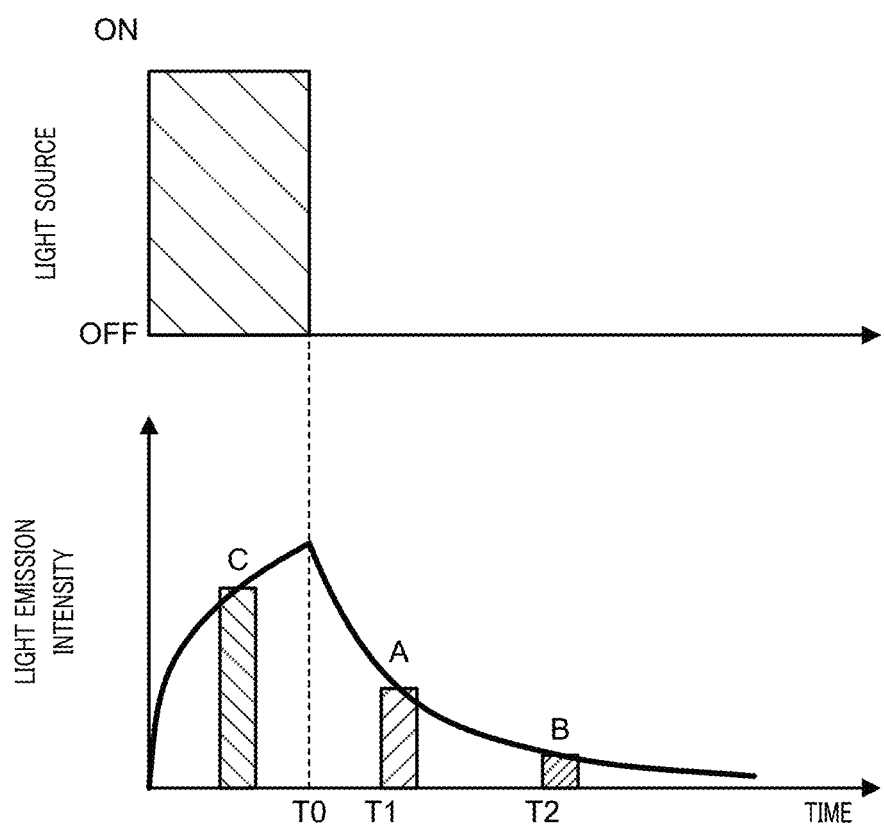
FIG. 9 illustrates the relationship between a light emission timing in the light detection sensor according to the embodiment 2 and the intensity of light radiated by a detection target.

FIG. 9 illustrates the relationship between a light emission timing in the light detection sensor 10 according to the embodiment 2 and the intensity of light radiated by the transported object X.

As described above, after the passage detection sensor detects the transported object X, the light source control unit 45 turns on the UV light source of the light source 13 at the timing when the detection target TA of the transported object X reaches the detection region C illustrated in FIG. 7. During the lighting of the UV light source, the third light receiving element 11c detects light from the detection region C.

At this time, the detection target TB is located upstream of the detection region A, and the detection target TB is irradiated with ultraviolet light that is excitation light. When the detection target TB is irradiated with the ultraviolet light, the intensity of the phosphorescence radiated from the detection target TB gradually increases with the passage of time.

After that, the light source control unit 45 turns off the light source 13 at a timing T0. After the irradiation with the ultraviolet light from the light source 13 stops, the detection target TB radiates afterglow, but the intensity of the afterglow is attenuated with the passage of time.

The first light receiving element 11a detects light from the detection region A at the first timing T1 when the detection target TB reaches the detection region A. In addition, the second light receiving element 11b detects the light from the detection region B at the second timing T2 when the detection target TB reaches the detection region B.

The determination unit 43 calculates the decay time constant τ of afterglow of the detection target TB from the intensity of the afterglow detected at the detection region A and the intensity of the afterglow detected at the detection region B. The determination unit 43 compares the calculated decay time constant τ of the afterglow with the reference values of the decay time constants τ of afterglow of the detection target T stored in the storage unit 44, to determine the substance comprised in the detection target T, and to decide the type and authenticity of the detection target T.

Further, the determination unit 43 compares the image of the transported object X acquired by the third light receiving element 11c during the irradiation with the white light, with images of the transported object X stored in the storage unit 44, which serve as the reference, to decide the type and authenticity of the transported object X.

The determination unit 43 further decides the type and authenticity of the detection target TA by using the image of the detection target TA, which is being irradiated with the ultraviolet light, acquired by the third light receiving element 11c.

As described above, the embodiment 2 of the present disclosure can capture the images of the detection targets TA and TB. The light detection device 100 of the present disclosure thus can further decide the type and authenticity of the detection target TA by using the captured image, in addition to the decay time constant τ of the afterglow of the detection target TB.

Phosphorescence radiated from the detection target TA during irradiation with the excitation light can also be detected in the embodiment 2 of the present disclosure. Therefore, the light detection device 100 of the present disclosure can accurately recognize the type and authenticity of the transported object X by deciding the type and authenticity of the detection target T.

The light detection sensor 10 and light detection device 100 comprising the detection sensor 10 can be downsized in the embodiment 2 as the third light receiving element 11c is disposed between the first light receiving element 11a and the second light receiving element 11b, and the rod lens unit 12 that forms images on the first light receiving element 11a and the second light receiving element 11b is the same as the rod lens unit 12 that forms an image on the third light receiving element 11c.

The light detection device 100 according to the embodiment 2 is, for example, provided in a sheet processing apparatus. The sheet processing apparatus can recognize the type or the authenticity of a sheet to be processed such as a banknote or a valuable security by deciding the type and authenticity of the detection target attached to the sheet based on light detected by the first light receiving element 11a and the second light receiving element 11b of the light detection sensor 10, an image acquired by the third light receiving element 11c, and the reference data stored in the storage unit 44.

In this case, the sheet processing apparatus firstly recognizes the type of sheet based on the image acquired by the third light receiving element 11c, and secondly recognizes the authenticity of the sheet based on whether or not a predetermined detection target T is detected from the sheet.

When the light detection device 100 is provided in the sheet processing apparatus, the light detection sensor control unit 41 of the light detection device 100 does not need to be provided with the determination unit 43, the storage unit 44, and the like. For example, a control unit (not illustrated) for controlling the sheet processing apparatus may comprise a storage unit that stores reference data regarding the detection target T, a recognition unit for recognizing the authenticity of sheets, and the like.

(Modification 1)

Figure 10:
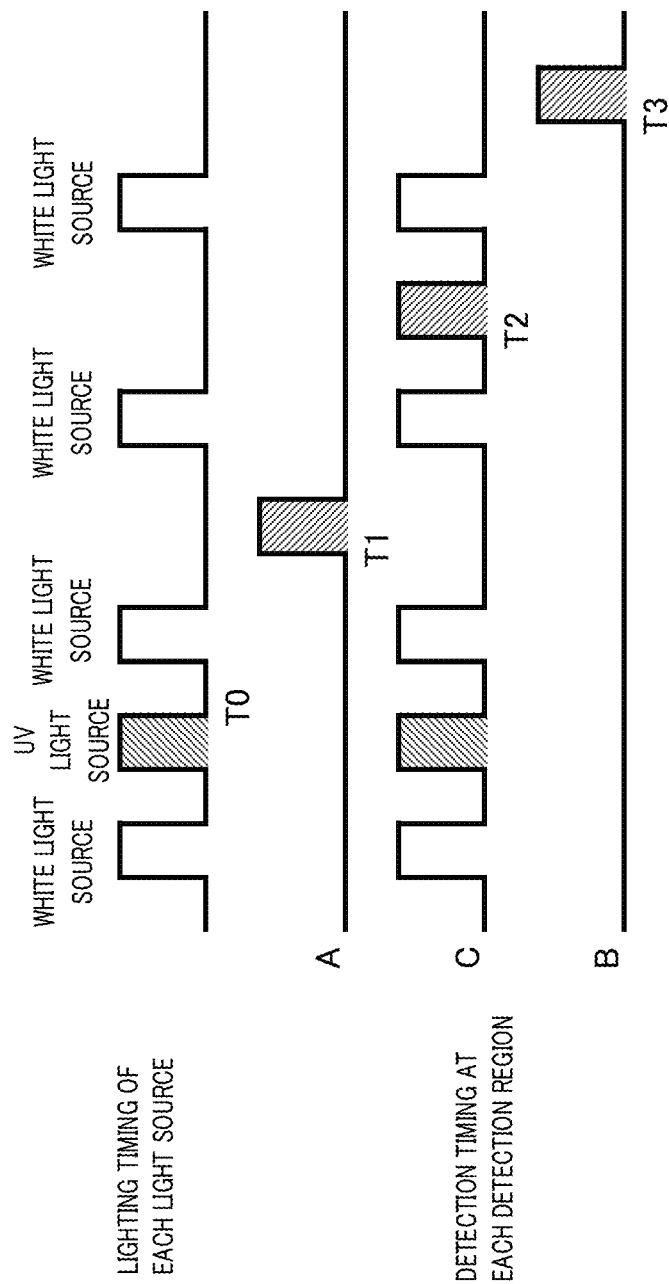
FIG. 10 illustrates the relationship between a lighting timing of each light source and a detection timing of each light receiving element according to modification 1 of the embodiment 2.

In the embodiment 2 described above, the first light receiving element 11a and the second light receiving element 11b detect the afterglow radiated from the detection target TB, but the third light receiving element 11c may also detect the afterglow radiated from the detection target TB. The modification will be described below with reference to FIG. 10. FIG. 10 illustrates the relationship between a lighting timing of each light source and a detection timing of each light receiving element according to the modification 1 of the embodiment 2.

When the transported object X reaches the detection region C after the passage detection sensor detects the transported object X, the light source control unit 45 controls a white light source of the light source 13 to blink, for example, four times at predetermined time intervals. During each lighting period of the white light source, the third light receiving element 11c acquires an image of the transported object X located in the detection region C.

The light source control unit 45 turns on a UV light source for a predetermined time at a timing when the detection target TA reaches the detection region C in the first extinction period. The third light receiving element 11c acquires an image of the detection target TA located in a detection region C during the lighting of the UV light source. At this time, the detection target TB on the upstream side of the detection target TA is located upstream of the detection region A illustrated in FIG. 7 and is excited by the ultraviolet light radiated from the UV light source that continues to be lit.

The light source control unit 45 turns off the UV light source at the timing T0 when the detection target TA passes the detection region C.

The first light receiving element 11a detects light from the detection region A at the first timing T1 when the detection target TB reaches the detection region A in the second extinction period.

In addition, the third light receiving element 11c detects light from the detection region C at the second timing T2 when the detection target TB reaches the detection region C in the third extinction period.

The second light receiving element 11b further detects the light from the detection region B at the third timing T3 when the detection target TB reaches the detection region B after the fourth lighting period of the white light source passes.

The light detection device 100 thus can detect the afterglow from the detection target TB by the first light receiving element 11a, the second light receiving element 11b and the third light receiving element 11c. The light detection device 100 according to the modification 1 can calculate the decay characteristics of afterglow from three detection results of the afterglow, and thus this calculation of the decay characteristics is more accurate than the calculation from the detection only by the first light receiving element 11a and second light receiving element 11b.

When the light receiving areas of the first light receiving element 11a, the second light receiving element 11b, and the third light receiving element 11c are different, even if light of the same intensity is received, the output differs depending on the light receiving area. In such a case, the detected value is corrected according to the light receiving area of each light receiving element.

(Modification 2)

Figure 11:
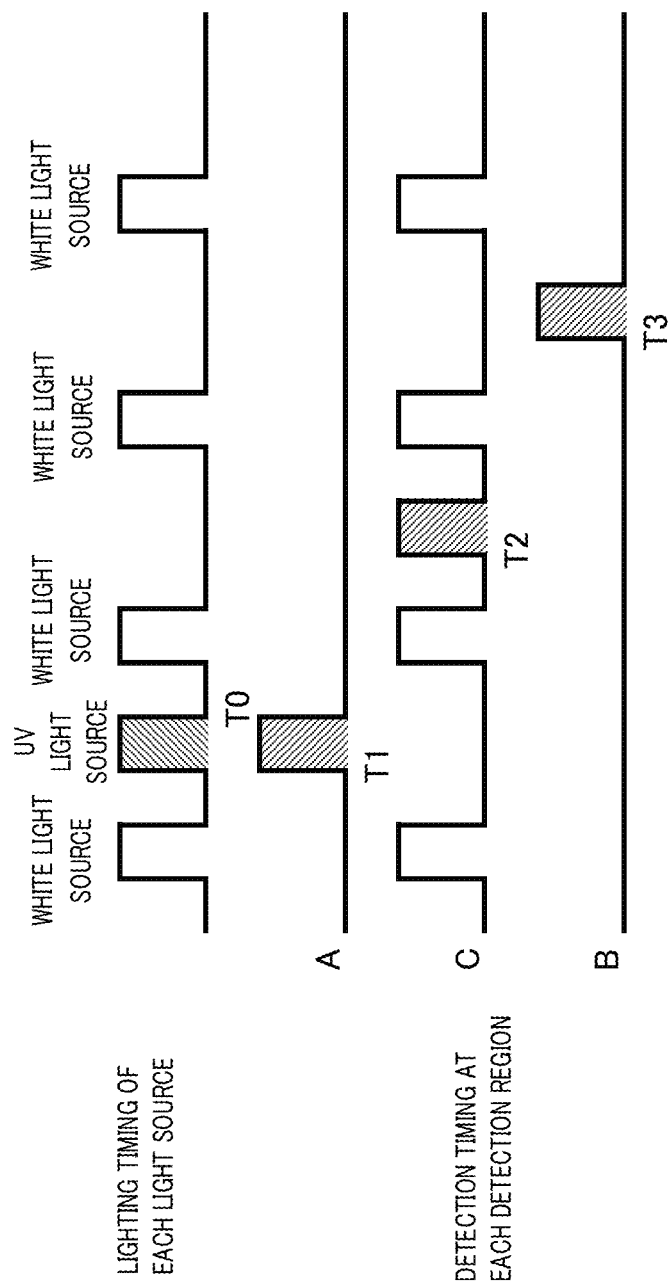
FIG. 11 illustrates the relationship between a lighting timing of each light source and a detection timing of each light receiving element according to modification 2 of the embodiment 2.
Figure 12A:
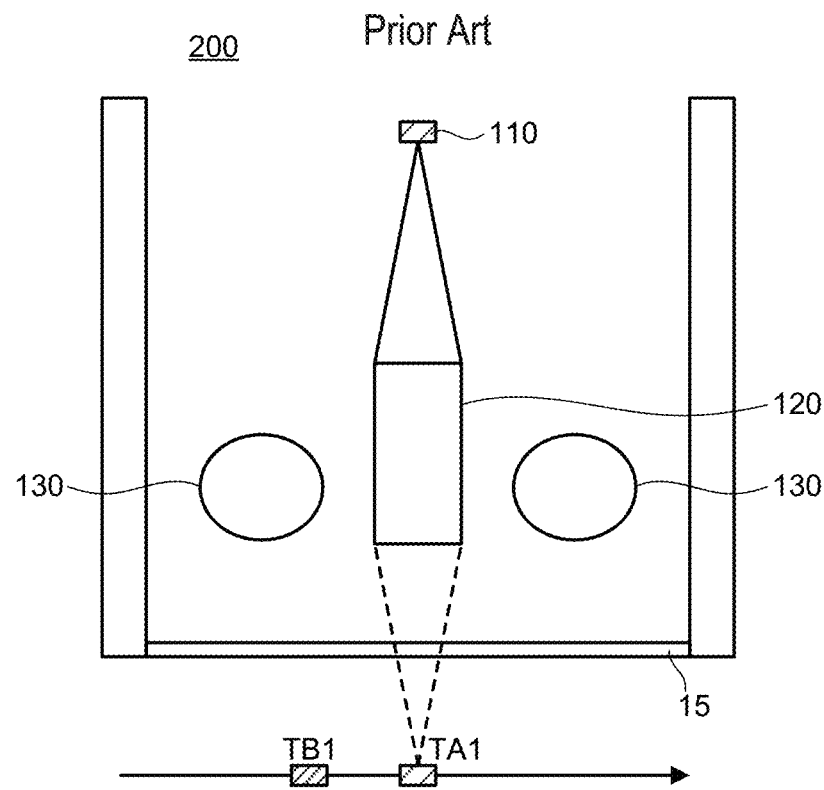
FIG. 12A is a diagram for explaining a light detection method in a conventional light detection sensor.
Figure 12B:
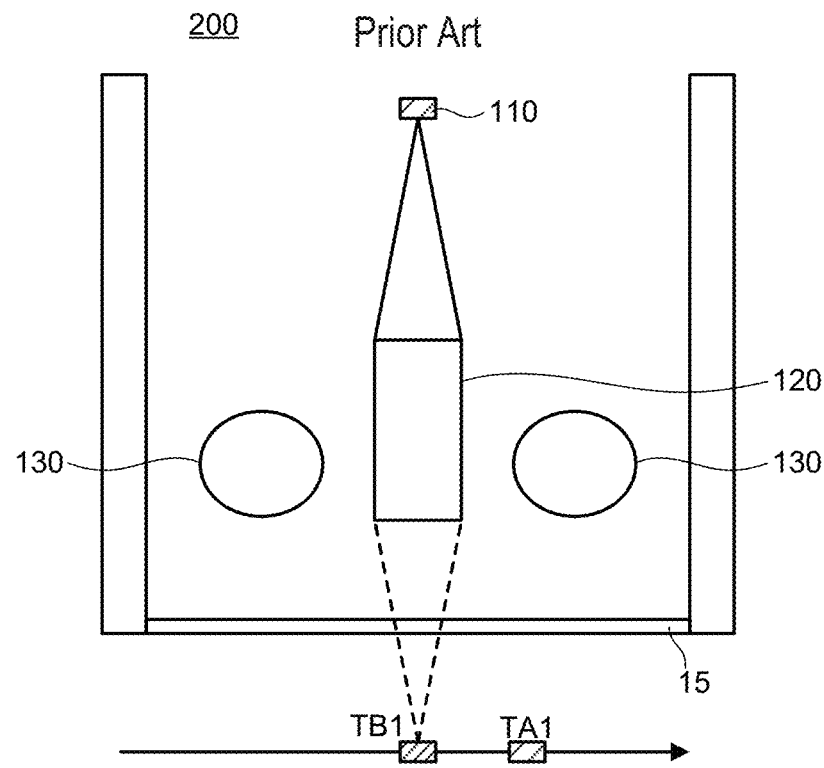
FIG. 12B is a diagram for explaining the light detection method in the conventional light detection sensor.

In the embodiment 2 described above, the third light receiving element 11c acquires the image of the detection target TA located in the detection region C during the lighting of the UV light source. However, the first light receiving element 11a may acquire the image of the detection target TB located in the detection region A during the lighting of the UV light source. The modification will be described below with reference to FIG. 11. FIG. 11 illustrates the relationship between a lighting timing of each light source and a detection timing of each light receiving element according to the modification 2 of the embodiment 2.

When the transported object X reaches the detection region C after the passage detection sensor detects the transported object X, the light source control unit 45 controls a white light source of the light source 13 to blink, for example, four times at predetermined time intervals. During each lighting period of the white light source, the third light receiving element 11c acquires an image of the transported object X located in the detection region C.

The light source control unit 45 turns on a UV light source for a predetermined time at the first timing T1 when the detection target TB reaches the detection region A in the first extinction period. During the lighting of the UV light source, the first light receiving element 11a detects light from the detection region A.

The light source control unit 45 turns off the UV light source at the timing T0 when the detection target TB passes the detection region A.

The third light receiving element 11c detects light from the detection region C at the second timing T2 when the detection target TB reaches the detection region C in the second extinction period.

Further, the second light receiving element 11b detects light from the detection region B at the third timing T3 when the detection target TB reaches the detection region B in the third extinction period. When the light receiving areas of the second light receiving element 11b and the third light receiving element 11c are different, even if light of the same intensity is received, the output differs depending on the light receiving area. In such a case, the detected value is corrected according to the light receiving area of each light receiving element.

The light detection device 100 thus can detect phosphorescence during irradiation with ultraviolet light and also calculate the decay time constant τ of afterglow. In addition, the relationship between the light emission timing in the light detection sensor 10 and the intensity of the light radiated by the transported object X as illustrated in FIG. 9 can be obtained by the detection from the same position (detection target TB), namely one position, on the transported object X.

(Modification 3)

As yet another example, the first light receiving element 11a, the second light receiving element 11b, and the third light receiving element 11c can detect phosphorescence emitted from the detection target TB during the irradiation with ultraviolet light. The modification will be described below.

After the passage detection sensor detects the transported object X, the light source control unit 45 turns on a UV light source in the light source 13 at a timing when the detection target TB reaches the detection region A illustrated in FIG. 7. The first light receiving element 11*a* detects light from the detection region A at this timing.

The light source control unit 45 continues lighting of the light source 13. The third light receiving element 11*c* detects light from the detection region C at a timing when the detection target T reaches the detection region C. In addition, the second light receiving element 11*b* detects light from the detection region B at a timing when the detection target T reaches the detection region B.

The light detection device 100 thus can detect phosphorescence radiated from the detection target TB by the first light receiving element 11*a*, the second light receiving element 11*b* and the third light receiving element 11*c*. The light detection device 100 thus can calculate the emission characteristic of the phosphorescence from three phosphorescence data, and thus the detection of the emission characteristic of the phosphorescence is more accurate than the detection of the phosphorescence only by the first light receiving element 11*a* and second light receiving element 11*b*. When the light receiving areas of the first light receiving element 11*a*, the second light receiving element 11*b*, and the third light receiving element 11*c* are different, even if light of the same intensity is received, the output differs depending on the light receiving area. In such a case, the detected value is corrected according to the light receiving area of each light receiving element.

In the embodiments 1 and 2 described above, the rod lens unit 12 comprising at least one rod lens is used as the lens for collecting light from the detection target T, but the lens for collecting the light from the detection target T is not limited to this configuration. For example, a lens unit in which a plurality of spherical lenses are arranged may be used. However, using the rod lens can shortens the optical distance, thereby downsizing the light detection sensor.

The first light receiving element 11*a* and the second light receiving element 11*b* are disposed at positions away from the central axis of the rod lens unit 12, and thus images formed on the first light receiving element 11*a* and the second light receiving element 11*b* may be blurred or distorted.

In this case, blurring and distortion of the formed image can be suppressed by directing the light receiving surfaces of the first light receiving element 11*a* and the second light receiving element 11*b* toward the rod lens unit 12 side, or providing a prism or the like to adjust the optical path length of the light incident on the first light receiving element 11*a* and the second light receiving element 11*b*.

In the embodiments 1 and 2, the first light receiving element 11*a* and the second light receiving element 11*b* detect phosphorescence (afterglow), but fluorescence during the irradiation of the detection target T with excitation light may be detected. In this case, the light detection device 100 can decide the authenticity of the detection target T based on the intensity of the detected fluorescence and the intensities stored as the reference values in the storage unit 44.

In the embodiments 1 and 2, the first light receiving element 11*a* and the second light receiving element 11*b* detect phosphorescence (afterglow), but reflected light from the detection target T may be detected.

For example, when the detection target T is a hologram such as a rainbow hologram, the first light receiving element 11*a* and the second light receiving element 11*b* detect reflected light from the detection target T.

In this case, the light source control unit 45 turns on a white light source of the light source 13 at a timing when the detection target T reaches the detection region A illustrated in FIG. 7. The first light receiving element 11*a* detects light from the detection region A at this timing. In addition, the second light receiving element 11*b* detects light from the detection region B at a timing when the detection target T reaches the detection region B.

The determination unit 43 decides the authenticity of the rainbow hologram that is the detection target T by deciding whether or not the color of light detected by the first light receiving element 11*a* and the color of light detected by the second light receiving element 11*b* match the reference colors of the detection target T stored in the storage unit 44.

In addition to the case where the detection target T is a rainbow hologram, the first light receiving element 11*a* and the second light receiving element 11*b* also detect reflected light from the detection region A and the detection region B when the detection target T is an ink such as an optically variable ink (OVI).

Also in this case, the determination unit 43 decides the authenticity of the OVI of the detection target T by deciding whether or not the color of light detected by the first light receiving element 11*a* and the color of light detected by the second light receiving element 11*b* match the reference colors of the detection target T stored in the storage unit 44.

This application is entitled to and claims the benefit of Japanese Patent Application No. 2018-072992 filed on Apr. 5, 2018, the disclosure of which including the specification, drawings and abstract is incorporated herein by reference in its entirety.

FIG. 13 illustrates a block diagram of a computer that may implement the various embodiments of the control unit 40, as described herein. The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on e computer, other programmable apparatus or other device to produce a computer implemented process, such that the instructions which execute on the computer, other programmable apparatus, or other device implement the functions specified in the flow diagrams and block diagrams in the present disclosure.

FIG. 13 is a functional block diagram illustrating a networked system 800 of one or more networked computers and servers, any one of which, or combinations of which may be the control unit 40 (FIG. 1). In an embodiment, the hardware and software environment illustrated in FIG. 13 may provide an exemplary platform for implementation of the software and/or methods according to the present disclosure. Referring to FIG. 13, a networked system 800 may include, but is not limited to, computer 805, network 810, remote computer 815, web server 820, cloud storage server 825 and computer server 830. In some embodiments, multiple instances of one or more of the functional blocks illustrated in FIG. 13 may be employed.

Additional detail of computer 805 is shown in FIG. 13. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805. Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm. Bus 837 may be a proprietary or industry standard high-speed parallel or serial peripheral interconnect bus, such as ISA, PCI, PCI Express (PCI-e), AGP, and the like. Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage, and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

INDUSTRIAL APPLICABILITY

The present disclosure can be widely used in a light detection sensor, a light detection device, a sheet processing apparatus and a light detection method.

REFERENCE SIGNS LIST

10 Light detection sensor
11*a* First light receiving element
11*b* Second light receiving element
11*c* Third light receiving element
12 Rod lens unit
13 Light source
14 Housing
14*a* Pair of side walls
15 Transparent cover
16 Light shielding means
30 Transport device
40 Control unit
41 Light detection sensor control unit
42 Detection unit
43 Determination unit
44 Storage unit
45 Light source control unit
46 Transport device control unit
110 Light receiving element
120 Lens unit
130 Light source
200 Light detection sensor
X Transported object
T Detection target
TA Detection target
TB Detection target
TC Detection target
TA1 Part of detection target
TB1 Other part of detection target

The invention claimed is:

1. A light detection sensor, comprising:
   a light source that irradiates a detection target with light;
   a rod lens that collects afterglow phosphorescence from the detection target;
   a first light receiving element that detects the afterglow that has passed through the rod lens at a first time; and
   a second light receiving element that detects, at a second time different than the first time, the afterglow that has been emitted from a same position of the detection target as a position from which the afterglow detected by the first light receiving element had been emitted and has passed through the rod lens, at a position different from a position at which the first light receiving element detects the afterglow.

2. The light detection sensor according to claim 1, further comprising:
   a third light receiving element disposed between the first light receiving element and the second light receiving element, the third light receiving element configured to also detect the afterglow that has passed through the rod lens.

3. The light detection sensor according to claim 2, wherein the rod lens is a rod lens array with a plurality of rod lenses arranged linearly, and including the third light receiving element and at least another third light receiving element are disposed along the rod lens array.

4. The light detection sensor according to claim 1, further comprising:
   at least another first light receiving element and at least another second light receiving element, wherein
   the rod lens is a rod lens array with a plurality of rod lenses arranged linearly, and
   the first light receiving element and the second light receiving element forming a first pair of light receiving elements disposed along the rod lens array, and the at least another first light receiving element and the at least another second light receiving element disposed pairwise along the rod lens array.

5. The light detection sensor according to claim 4, further comprising:
a third light receiving element disposed between the first light receiving element and the second light receiving element, the third light receiving element configured to also detect the afterglow that has passed through the rod lens, wherein the third light receiving element comprising a plurality of imaging elements each configured to capture an image of at least a portion of the detection target, the plurality of imaging elements being disposed along the rod lens array.

6. The light detection sensor according to claim 1, wherein the rod lens comprises a gradient index lens.

7. The light detection sensor according to claim 1, wherein the first light receiving element and the second light receiving element are configured to detect, as the afterglow, reflected light from the detection target.

8. A light detection device, comprising:
a light detection sensor including
   a light source that irradiates a detection target with light,
   a rod lens that collects afterglow phosphorescence from the detection target,
   a first light receiving element that detects the afterglow that has passed through the rod lens at a first time, and
   a second light receiving element that detects, at a second time different than the first time, the afterglow that has been emitted from a same position of the detection target as a position from which the afterglow detected by the first light receiving element had been emitted and has passed through the rod lens, at a position different from a position at which the first light receiving element detects the afterglow;
a conveyor that transports a transported object; and
circuitry configured to control the light detection sensor and the conveyor, wherein the first light receiving element and the second light receiving element are disposed side by side in a transport direction of the conveyor, wherein
the circuitry is configured to control the first light receiving element and the second light receiving element to detect the afterglow from the detection target located at one position on the transported object.

9. A sheet processing apparatus, comprising:
the light detection device according to claim 8;
a non-transitory computer readable medium configured to store reference data regarding the detection target, wherein
the circuitry is configured to recognize an authenticity of a sheet based on the reference data and the afterglow detected by the first light receiving element and the second light receiving element, the sheet being the transported object.

10. A light detection device, comprising:
a light detection sensor including
   a light source that irradiates a detection target with light,
   a rod lens that collects afterglow phosphorescence from the detection target,
   a first light receiving element that detects the afterglow that has passed through the rod lens at a first time, and
   a second light receiving element that detects, at different timings a second time different than the first time, the afterglow that has been emitted from a same position of the detection target as a position from which the afterglow detected by the first light receiving element had been emitted and has passed through the rod lens, at a position different from a position at which the first light receiving element detects the light afterglow;
a conveyor that transports a transported object; and
circuitry configured to control the light detection sensor and the conveyor, wherein the first light receiving element and the second light receiving element are disposed side by side in a transport direction of the conveyor, wherein
the circuitry is configured to control the first light receiving element and the second light receiving element to detect the afterglow from the detection target located at one position on the transported object, and the circuitry is further configured to calculate a decay characteristic of the afterglow from the detection target located at the one position on the transported object.

11. A sheet processing apparatus, comprising:
the light detection device according to claim 10;
a non-transitory computer readable medium configured to store reference data regarding the detection target, wherein the circuitry is configured to recognize an authenticity of a sheet based on the reference data and the afterglow detected by the first light receiving element and the second light receiving element, the sheet being the transported object.

12. A light detection method, comprising:
transporting, by a conveyor, a transported object comprising a detection target; and
controlling the conveyor and a light detection sensor comprising a first light receiving element and a second light receiving element disposed side by side in a transport direction of the transported object, wherein
the controlling includes detecting afterglow phosphorescence with the first light receiving element at a first time and the second light receiving element at a second time different than the first time, the afterglow being emitted from the detection target while located at one position on the conveyor, the second light receiving element detecting the afterglow that has been emitted from a same position of the detection target as a position from which the afterglow detected by the first light receiving element had been emitted.

* * * * *